July 15, 1969          L. H. BERND          3,455,265
AIR FILM DRAG REDUCTION STABILIZATION
Filed Feb. 28, 1968
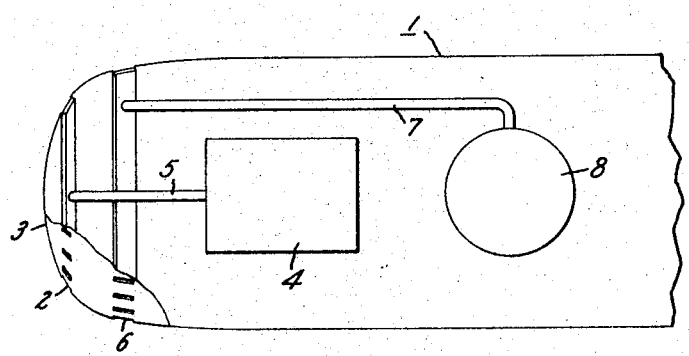
Inventor:
Leslie H. Bernd,
by Paul A. Frank
His Attorney.

United States Patent Office 3,455,265
Patented July 15, 1969

3,455,265
AIR FILM DRAG REDUCTION STABILIZATION
Leslie H. Bernd, Altamont, N.Y., assignor to General
Electric Company, a corporation of New York
Filed Feb. 28, 1968, Ser. No. 709,016
Int. Cl. B63b 1/34
U.S. Cl. 114—67        7 Claims

ABSTRACT OF THE DISCLOSURE

The drag on a vehicle in water is reduced by injecting a surfactant material into the liquid adjacent the vehicle to form a thin, elastic, high strength layer on the water adjacent the vehicle and injecting a layer of gas between the surfactant layer and the vehicle. The surfactant may be a fatty acid or soap, cetyl alcohol, a water soluble protein, animal or fish oil, or a detergent.

---

My invention relates to methods and apparatus for reducing the drag of bodies of vehicle moving in a liquid medium, such as water, and more particularly to methods and apparatus for producing high-strength films on the water boundary layer adjacent a vehicle to permit surrounding the vehicle with a gas film and reducing the drag of the water on the vehicle.

The maintenance of the film of gas about an underwater body, such as a torpedo, strut, or pontoon, has been proposed as a means for radically reducing the drag of the body, one such system being disclosed in the Eichenberger Patent 3,075,489. In such arrangements, the negligible viscosity of a gas is substituted for the appreciable viscosity of water. A major obstacle to the successful application of such principles, however, is that the water-gas interface is unstable. The gas film is quickly broken up, a bubbly water-gas mixture is formed and the advantage of the low viscosity of the gas is lost. Accordingly, it is the primary object of my present invention to provide methods and apparatus for creating a stabilizing surface film at the water-gas interface so that a low drag air film can be maintained adjacent the body.

It is known that certain types of films placed on the surface of water inhibit surface motion and reduce water action. On the other hand, ordinarily film formation is a slow process, in fact, so slow that it is not possible to create effectively a stabilizing film at the water-gas interface to effectively use a film of gas about an underwater body to reduce drag. Turbulence, bubbles, and other disturbances continually interrupt the gas fluid interface and destroy the gas film. Accordingly, it is most desirable to find methods and means of forming films rapidly to make it possible to create a stabilizing film at the water-gas interface when gas is injected about a rapidly moving vehicle in water.

It is known that appreciable damping of waves on the surface of water does occur when monolayers of hydrocarbons or proteins are present or a thin layer of an animal oil, such as seal, fish, or whale oil is present, or when a detergent is dissolved in the water. These films possess different physical characteristics and act to stabilize and reduce surface motion in different ways. The means used in my invention to generate and use these films consequently varies in certain essential details, depending upon the characteristics of the film as well as the characteristics of the materials used to form the film.

Suitable hydrocarbon or protein monolayers for stabilizing the surface of the water are known to be solid-like in their mechanical properties. Such films are insoluble in water. Producing such monolayers ordinarily takes an appreciable time for various reasons related to their insolubility and solid-like nature. The desirability of such films is their action as an elastic solid opposing surface motion, their ability to provide a viscous drag with respect to the motion of the water, their ability to damp motion because of internal friction, as well as certain other inherent properties.

It is an object of my invention to provide new and improved methods and apparatus for rapidly forming elastic high-strength films on water.

It is a further object of my invention to rapidly form elastic high-strength films on water that are heavier and thicker than monolayers, and hence stronger and better able to damp surface motion than a customary monolayer film.

A thin layer of oil of animal or fish origin possesses the desirable ability to provide a viscous drag to oppose the motion of the water. Oils are insoluble in water. Producing a layer of oil on a water surface can be a slow process because of pre-existent films on the surface of the water that subsequently prevent the rapid spreading of the oil. It is therefore another object of my invention to provide new and improved methods and apparatus which prevent the formation of such pre-existent films and rapidly form a thin layer of oil on water.

Detergents are particularly suitable for forming stabilizing films on a water surface because they are soluble in water and highly mobile. Stabilization of the water surface occurs because the concentration of detergent at the surface of the water decreases as the surface is extended, thus increasing the surface tension, which acts to contract the surface.

Accordingly, it is another object of my invention to provide new and improved methods and apparatus for rapidly forming films consisting of solutions of detergents on the surface of water.

In its broadest aspect, my invention consists in providing methods and apparatus for reducing the drag on vehicles in water by rapidly forming a thin elastic, high-strength layer on the water surface to form a boundary layer adjacent to the vehicle and injecting a layer of gas between the surfactant layer and the vehicle. In another of its aspects I provide methods and apparatus for reducing the drag on vehicle in water by preventing the formation of films on a water surface to obtain a clean surface on the water adjacent to the vehicle, rapidly forming a thin layer of oil or water solution of detergent on the clean water surface to form a boundary layer adjacent to the vehicle, and injecting a layer of air between the layer of oil or detergent solution and the vehicle.

These and other objects, features, and advantages of the present invention will become more apparent upon consideration of the following detailed description when considered in conjunction with the accompanying drawing in which FIGURE 1 is a schematic cross-section of a vehicle employing my drag reduction invention.

The underwater vehicle illustrated schematically in FIGURE 1 may comprise a torpedo, submarine, or some similar vehicle 1 having a plurality of apertures 2 located as a ring near the center of its nose or bow 3. By the term "vehicle" or "water vehicle" is meant any body which has movement relative to an adjacent liquid. The openings 2 are positioned so that they direct downstream from the bow a surfactant material supplied thereto from a source 4. By the term "surfactant" is meant any surface active material which is capable of modifying the properties of the liquid medium at a surface or interface by reducing surface tension or interfacial tension. The source 4 comprises apparatus for mixing a liquid, preferably obtained from the medium surrounding the vehicle with the surfactant. Thus, the apparatus 4 may comprise, for example, that described in the co-pending joint application Ser. No. 642,961 filed June 1, 1967 of Walter B.

Giles and William T. Pettit III and assigned to the assignee of the present invention. This application discloses apparatus which extracts ambient liquid, pumps the liquid as a high pressure jet into a mixing chamber, forces the surfactant additive in neutral density liquid suspension into a jet and partially mixes the surfactant additive with the liquid. From the mixing chamber the partially mixed solution passes into a honeycombed mixing chamber where mixing is substantially completed. After mixing, the surfactant solution is transmitted through a conduit 5 to the apertures 2 near the nose or leading edge of the vehicle and injected into the surrounding liquid. By injecting the surfactant additive near the vehicle nose or leading edge, it is injected into a region of the boundary layer which is highly stable due to favorable pressure gradients and, therefore, less susceptible to disturbances by the injection. Also, this provides a nearly-uniform peripheral distribution of the solution along the outer surface of the vehicle. To facilitate the injection without disturbing the stability of the boundary layer, the injection nozzle 2 may comprise, in a well-known manner, a porous material, a plurality of slots, or a multiplicity of holes of relatively high hydraulic impedance, or simply a single slot.

Downstream from the injection openings 2 are located around the hull of the vehicle 1 a ring of gas injection openings 6. The openings 6 may be porous members, or alternatively, slots. Connected to openings 6 through a conduit 7 is a source 8 of a gas under pressure. Preferably the gas employed is air and source 8 may comprise a conventional compressor. In accordance with my invention the gas under pressure is introduced to form a film between the hull of vehicle 1 and the layer of surfactant additive introduced through injection openings 2. In introducing the gas to form the film, I obtain both uniform injection by means of the openings 6 and at the same time, the location of these openings and the body shape of the vehicle 1 establish a pressure gradient which favorably permits the gas to flow along the surface of the hull without mixing with the surfactant layer previously placed on the boundary liquid.

The surfactant material employed may be any material which is suitable for modifying the liquid properties of the water at its surface or interface by producing a surface film and reducing the surface tension or interfacial tension. I have found that any of certain types of organic materials that are insoluble in water, such as a long-chained hydrocarbon material, for example lauric acid, cetyl alcohol, or a protein such as egg albumen, is satisfactory for use in accordance with my invention to form elastic, high-strength films to stabilize a surface. Such materials have slight solubility in water, so before injecting into the flow stream, they are dissolved in apparatus 4 in an ethyl or methyl alcohol or ketone that is miscible in the water. In addition to the hydrocarbon and protein material mentioned above, I have also found that oils or detergents are satisfactory for the purpose of stabilizing a water surface. The oil or detergent may be used directly. The detergent may also be predissolved in water.

An important aspect of my method for forming an elastic, high-strength film is that the flow stream to which the surfactant is applied is turbulent. By injecting the alcohol solution into the turbulent boundary layer one contains rapid mixing with the water, so that a film is rapidly formed on the boundary layer as the gas or air is injected from orifices 6 to form a gas film adjacent the water vehicle to reduce the drag on the vehicle. Thus, in forming the surfactant material to be injected into the turbulent boundary layer, after dissolving the hydrocarbon in the alcohol or other mixing solution, the mixture is mixed with the water in the boundary layer through turbulent mixing to reduce the overall solubility and provide a supersaturated solution which is capable of forming a heavy film at the boundary layer. This is in contrast with the previously accepted concept that laminar flow is required in order to maintain a gas film to reduce drag. I have found that turbulent flow facilitates mixing the surfactant with the water to form a stabilizing film.

I have found also, that when oil is laid on the surface of water, it often spreads fairly slowly. For example, animal oils used for calming waters take a few minutes to spread out and be effective. On the other hand, when a new fresh water surface is made, a drop of oil placed on the new water surface spreads rapidly at a velocity of at least five feet per second. Also, oils that normally do not spread, spread rapidly on a fresh water surface. This difference between spreading on a freshly formed water surface and a normal surface is because monolayers form on the surface from trace contaminants dissolved in the water or from airborne dust. These monolayers, even though they often exist in only partial fragmentary form, compete with the oil to occupy the surface of the water. If the oil is to spread, it must be more attractive to the water than a contaminant and must force the contaminant molecules aside. Accordingly, in the practice of my invention it is desirable that the surfactant, if it is an oil, be applied to a water surface on which the monolayer of contaminants mentioned previously does not exist in order to permit the surfactant to spread extremely rapidly. On such a surface only an extremely small amount of surfactant is needed to establish a monomolecular film of surfactant so that the gas or air can be injected between that film and the outer surface of the water vehicle.

The monolayer of contaminants previously mentioned is prevented from forming in my invention by having the flow of water about the vehicle laminar from the nose of the vehicle downstream to openings 6. This is readily done by having a suitable streamline shape for the nose of the vehicle. I have found that in turbulent flow the monolayer of contaminants forms in less than a second from contaminants dissolved in the water in a concentration of 1 part in 1,000,000,000.

In accordance with my invention, five classes of compounds provide satisfactory surfactants, namely: (1) unbranched hydrocarbons such as a fatty acid or soap, for example, lauric acid; (2) certain unbranched alcohols such as cetyl alcohol, and particularly long-chained hydrocarbons where on end is polar and the other is a hydrocarbon compound; (3) proteins which are soluble in water, such as, for example, egg albumen; (4) oils of fish or animal origin; and (5) detergents. One characteristic of the materials found suitable in classes one through three is that they have closely packed molecules which serve to form a film or closely-packed interface between the water and the air which is injected between the interface and the vehicle. It is desirable to provide a surplus of such materials to help provide a closely packed, compressed film.

I have also found that my invention, when combined with the technique taught by W. B. Giles in his co-pending application, S.N. 707,497 filed February 23, 1968, and assigned to the assignee of this invention, wherein a polymeric additive is injected into the water to modify the turbulence of the water and stabilize a gas-water interface, results in a highly stable gas-water interface; more so than if a polymeric additive alone is used.

While specific embodiments of my invention have been illustrated and described, the invention is not limited thereto since many modifications may be made by one skilled in the art and the appended claims are intended to cover all such modifications which fall within the true spirit and scope of my invention.

What I claim as new and desire to secure by Letters Patent of the United States is:

1. A method of reducing frictional drag on a water vehicle which comprises
  injecting a surfactant selected from the group consisting of fatty acids and soaps, unbranched alcohols, water-soluble proteins, fish oils, animal oils, and detergents into a boundary layer of water adjacent the vehicle to establish a film on the water along the side of the vehicle and injecting a gas between the film thus established and the vehicle.

2. The method of claim 1 in which the surfactant comprises lauric acid.

3. The method of claim 1 in which the surfactant comprises cetyl alcohol.

4. The method of claim 1 in which the surfactant comprises egg albumen.

5. The method of claim 1 in which the surfactant is combined with a solvent compatible with the liquid surrounding the vehicle before injection into that liquid.

6. The method of claim 1 which includes the step of dissolving the surfactant in an alcohol before it is injected in the water.

7. The method of claim 1 in which the surfactant is injected into a turbulent boundary layer of water adjacent the vehicle.

References Cited

UNITED STATES PATENTS

| | | | |
|---|---|---|---|
| 3,016,865 | 1/1962 | Eichenberger | 114—67 |
| 3,230,919 | 1/1966 | Crawford | 114—67 |

ANDREW H. FARRELL, Primary Examiner